United States Patent [19]
Yano et al.

[11] Patent Number: 5,161,503
[45] Date of Patent: Nov. 10, 1992

[54] IGNITION CONTROLLER

[75] Inventors: Akitoshi Yano; Shinji Kawamura, both of Shizuoka; Tateshi Shimizu; Masaya Tomoda, both of Hamamatsu, all of Japan

[73] Assignee: Suzuki Motor Corporation, Hamamatsu, Japan

[21] Appl. No.: 596,686

[22] Filed: Nov. 1, 1990

Related U.S. Application Data

[62] Division of Ser. No. 436,190, Nov. 13, 1989, Pat. No. 5,027,770.

[30] Foreign Application Priority Data

Nov. 18, 1988 [JP] Japan .................................. 63-293280
Jan. 20, 1989 [JP] Japan .................................... 1-11067
Feb. 28, 1989 [JP] Japan .................................... 1-47548

[51] Int. Cl.⁵ .......................................... F02P 11/00
[52] U.S. Cl. ........................................ 123/335; 74/860
[58] Field of Search ................... 123/335, 334; 74/860

[56] References Cited

U.S. PATENT DOCUMENTS 4,492,197 1/1985 Yamamoto et al. ................. 123/334
4,558,673 12/1985 Mackie .............................. 123/335

FOREIGN PATENT DOCUMENTS 59-168274 9/1984 Japan .................................. 123/335
59-231173 12/1984 Japan .................................. 123/335

Primary Examiner—Andrew M. Dolinar
Attorney, Agent, or Firm—Handal & Morofsky

[57] ABSTRACT

An engine ignition controller in which, when a transmission is set at the first speed stage, ignition timing is set on the basis of an angle advance characteristic for causing the output of an engine to be decreased. Immediately before a vehicle speed reaches a vehicle speed limit, ignition is carried out according to an ignition pattern having a misfire rate to cause an increase rate of the vehicle speed to be decreased; while, when the vehicle speed exceeds the vehicle speed limit, ignition is carried out according to an ignition pattern having a misfire rate to cause the vehicle speed to be reduced. Further, different speed limits are set for respective speed stages higher in speed stage number than a certain speed stage so that, when the vehicle speed exceeds the vehicle speed limits, ignition is carried out according to ignition patterns to cause the vehicle speed to be decreased.

5 Claims, 13 Drawing Sheets

[PATTERN A]

| | | | | | | | | |
|---|---|---|---|---|---|---|---|---|
| #1 CYLINDER | × | | | | O | | | |
| #2 CYLINDER | | O | | | | O | | |
| #3 CYLINDER | | | | O | | | | O |
| #4 CYLINDER | | | O | | | | O | |

FIG. 9

[PATTERN B]

| | | | | | | | | |
|---|---|---|---|---|---|---|---|---|
| #1 CYLINDER | × | | | | O | | | |
| #2 CYLINDER | | × | | | | O | | |
| #3 CYLINDER | | | | O | | | | O |
| #4 CYLINDER | | | O | | | | O | |

FIG. 10

[PATTERN C]

| | | | | | | | | |
|---|---|---|---|---|---|---|---|---|
| #1 CYLINDER | × | | | | O | | | |
| #2 CYLINDER | | × | | | | O | | |
| #3 CYLINDER | | | | O | | | | O |
| #4 CYLINDER | | | × | | | | O | |

FIG. 11

| #1 CYLINDER | × |   |   | ○ |   | × |   |   | ○ |   |
|---|---|---|---|---|---|---|---|---|---|---|
| #2 CYLINDER |   | × |   |   | ○ |   | × |   |   | ○ |
| #3 CYLINDER |   |   | ○ |   |   | ○ |   | ○ |   |   |
| #4 CYLINDER |   |   | × |   |   | ○ |   | × |   |   |
FIG.17
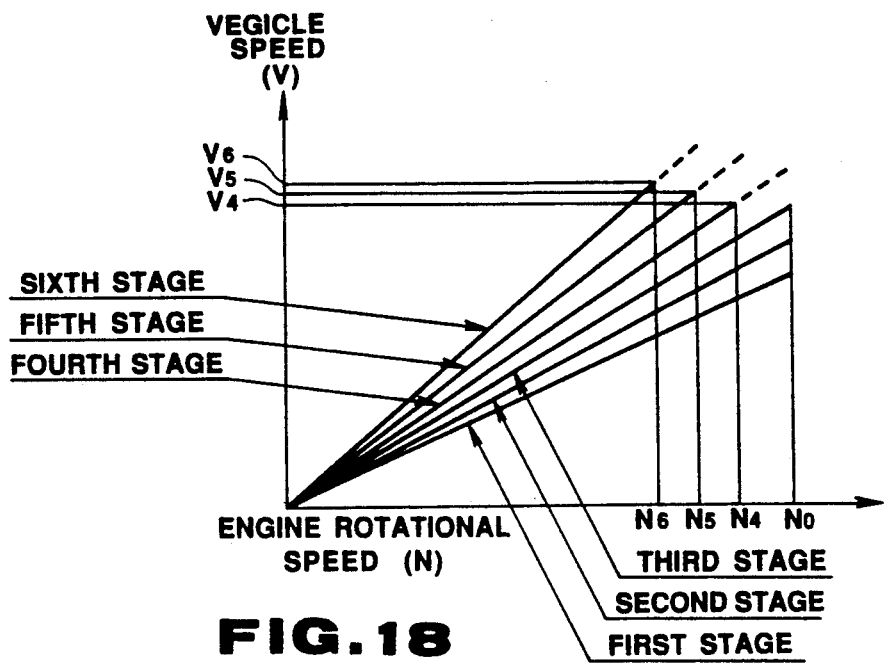
FIG.18
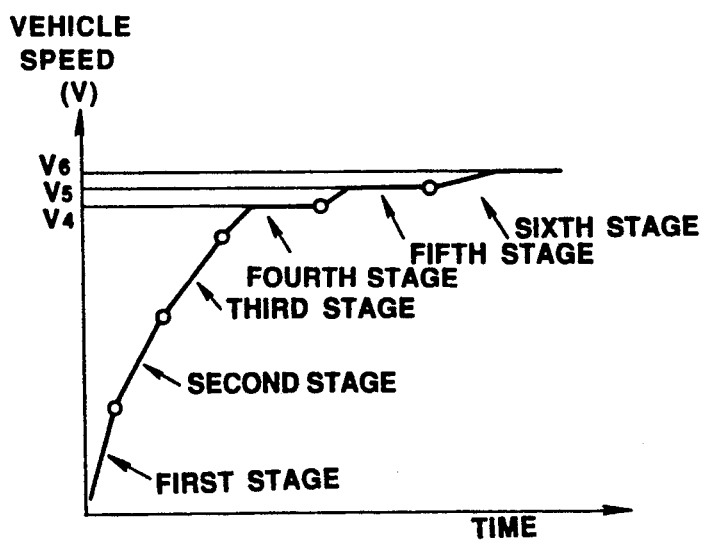
FIG.19

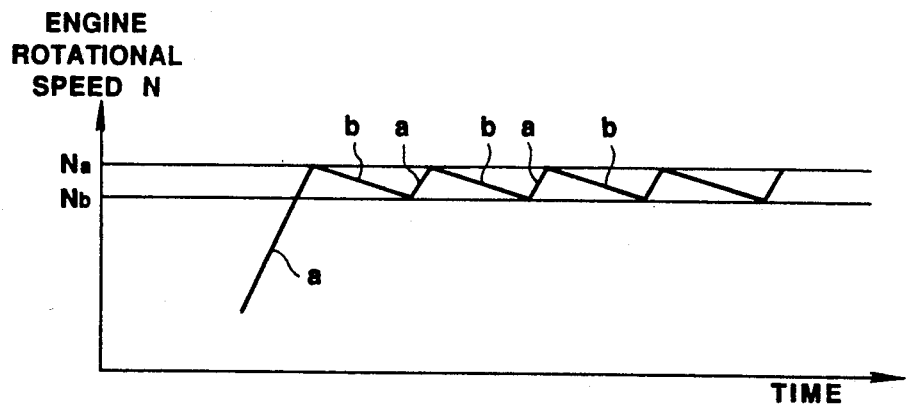
FIG. 21 *(PRIOR ART)*
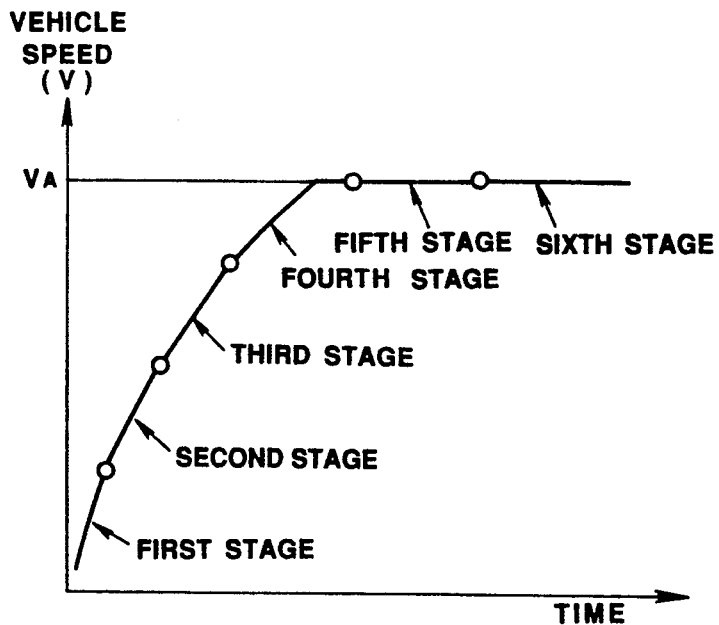
FIG. 22 *(PRIOR ART)*
FIG. 23 *(PRIOR ART)*

IGNITION CONTROLLER

This application is a division of application Ser. No. 436,190, now U.S. Pat. No. 5,027,770, filed Nov. 13, 1989.

BACKGROUND OF THE INVENTION

1. Field of the Invention

The present invention relates to an ignition controller which is applied to a vehicle engine.

2. Description of the Related Art

As well known, a vehicle engine is provided with an ignition-timing adjusting means. The ignition-timing adjusting means functions to advance the ignition timing as the rotational speed of the engine increases.

Meanwhile, such a vehicle as, for example, a racing motor bycycle is mounted with a high output engine. In the case of such a racing two-wheel vehicle, when the vehicle is running with a speed shift gear set at a high speed stage, the engine output must be maximum; whereas, when the shift gear is set at an intermediate speed stage, the engine output must be relatively high for acceleration. When the shift gear is set at the first speed stage as at the time of starting the vehicle or when the vehicle is running along a sharply curved road, it is unnecessary for the engine output to be very high.

The conventional ignition-timing adjusting means has no function of suppressing the engine output when the shift gear is set at the first speed stage. Therefore, when the racing vehicle or the like is running with the shift gear set at the first speed stage, the engine output becomes excessively high. For this reason, the rider has had to carefully adjust the opening of an accelerator to obtain comfortable acceleration.

Meanwhile, in the case of such a two wheeler, it is dangerous to increase the vehicle speed limitlessly.

To this end, there has been suggested an ignition controller which reduce the number of ignition times for the engine when the vehicle speed exceeds a preset vehicle speed limit (allowable maximum vehicle speed).

In this ignition controller, ignition is carried out according to such an ignition pattern as exemplified in FIG. 22 when the vehicle speed exceeds the aforementioned vehicle speed limit.

In the above ignition pattern, which is applied to a 4-cylinder engine, #1, #2 and #4 cylinders of the four cylinders are misfired respectively once per two times. In other words, the engine is ignited at a misfire rate of ⅜. In FIG. 22, mark ◯ denotes ignition and mark × denotes misfiring respectively.

When ignition is effected according to the aforementioned ignition pattern, the vehicle speed can be quickly decreased so that acceleration and deceleration are repeated at a short period. That is, a hunting phenomenon takes place in the engine rotational speed nearly at an engine rotational speed $N_a$ corresponding to a control vehicle speed.

For this reason, the prior art ignition controller has had such a disadvantage that, when such an ignition pattern as mentioned above is used, rider's running comfortableness is deteriorated.

In FIG. 21, reference symbol $N_b$ represents a preset rotational speed somewhat lower than the rotational speed $N_a$, symbol a represents an increasing part in the engine rotational speed during ordinary ignition having a misfire rate of zero, and b represents a decreasing part in the engine rotational speed while ignition is effected based on the above ignition pattern, respectively.

In the case where the motor bicycle is, for example, of a 750 cc class, sports type, even when the transmission is set at a relatively low speed stage, the motor bicycle can run at a high speed.

More in detail, in the case where the transmission of the motor bicycle has first to sixth speed stages, the motor bicycle reaches the allowable maximum vehicle speed (vehicle speed limit) $V_A$ during running of the vehicle set, for example, at the fourth speed stage, as shown in FIG. 23. Under such a condition, even when the speed stage is shifted up from the fifth speed stage to the sixth, the vehicle speed will not increase.

When the driver shifts up the shift gear, he expects that the vehicle will be accelerated. For this reason, with the prior art ignition controller, such driver's expection is belied, which is one of factors deteriorating his driving comfortableness.

SUMMARY OF THE INVENTION

It is a first object of the present invention to provide an ignition controller which can suppress the output of an engine when a transmission is set at the first speed stage.

In accordance with an aspect of the present invention, the above first object is attained by providing an engine ignition controller for controlling ignition timing in an engine in accordance with predetermined angle advance characteristics, which controller comprises speed stage detecting means for detecting the first one of speed stages of a transmission being set, means for setting one of said angle advance characteristics corresponding to said first speed stage to suppress an output of said engine, and means, when said speed stage detecting means detects the first speed stage, for controlling ignition timing in accordance with said set angle advance characteristic.

In accordance with the above ignition controller, ignition timing is controlled according to one of the angle advance characteristics for the first speed stage when the speed stage is the first one, so that the engine output is suppressed. As a result, when the vehicle is running with the first speed stage, the driver can obtain running comfortableness without conducting any troublesome accelerator adjustments.

It is a second object of the present invention to provide an ignition controller which can suppress, to a minimum extent, such a hunting phenomenon that the engine rotational speed cyclically hunts nearly at the above vehicle speed limit, thus realizing improvements in driver's driving comfortableness.

In accordance with another aspect of the present invention, the above second object is attained by providing an ignition controller which comprises rotational speed detecting mean for detecting a rotational speed of an engine, speed stage detecting means for detecting one of speed stages of a transmission being used, reference vehicle speed setting means for presetting first reference vehicle speeds lower than a vehicle speed limit and a second reference vehicle speed corresponding to said vehicle speed limit, means for converting said first reference vehicle speeds and said second reference vehicle speed to corresponding first reference engine rotational speeds and second reference engine rotational speed on the basis of said speed stage being used detected by said speed stage detecting means, ignition pattern setting means for presetting therein first ignition patterns having misfire rates to suppress an increase rate in a vehicle speed as well as a second ignition pattern having a misfire rate to reduce said vehicle speed, comparison means for comparing said engine rotational speed detected by said engine rotational speed detecting means with said first and second reference engine rotational speeds to instruct said first ignition patterns when said detected rotational speed exceeds said first reference engine rotational speeds and when the detected rotational speed drops to the first reference engine rotational speeds and to instruct said second ignition pattern when the detected rotational speed exceeds said second reference engine rotational speed, and means for generating ignition signals based on said patterns.

In accordance with another aspect of the ignition controller of the present invention, since the vehicle speed is decreased before the vehicle speed reaches the vehicle speed limit, such a hunting phenomenon that the engine rotational speed abruptly hunts nearly at the vehicle speed limit can be suppressed, thus improving driver's driving comfortableness.

It is a third object of the present invention to provide an ignition controller which can give an acceleration feeling to the driver at the time of shift-up.

In accordance with a further aspect of the present invention, the above third object is attained by providing an ignition controller which comprises rotational speed detecting means for detecting a rotational speed of an engine, ignition pattern setting means for setting therein an ignition pattern having a misfire rate to reduce a vehicle speed, reference vehicle speed setting means for setting, as vehicle speed limits, reference vehicle speeds corresponding to speed stages of a transmission higher in stage number than predetermined one of said speed stages respectively, speed stage detecting means for detecting selected one of said speed stages being used, means for converting said reference vehicle speeds into corresponding engine rotational speeds on the basis of said use speed stage detected by said speed stage detecting means, comparison means for comparing a rotational speed detected by said engine rotational speed detecting means with said engine rotational speeds converted by said means to instruct ignition based on said ignition pattern when said detected rotational speed exceeds said converted reference engine rotational speeds, and means for generating ignition signals based on said instructed ignition pattern, and wherein said reference vehicle speeds of the speed stages are set to be gradually larger for the higher speed stages.

In accordance with yea a further aspect of the ignition controller of the present invention, since different vehicle speed limits are set for speed stages other than a certain speed stage respectively, more specifically, since larger vehicle speed limits are set for the higher speed stages respectively, the vehicle can be accelerated at the time of gear shift-up. As a result, driver's expectation that a shift-up operation will accelerate the vehicle can be satisfied and his driving comfortableness can be improved.

BRIEF DESCRIPTION OF THE DRAWINGS

FIGS. 9, 10 and 11 are tables showing exemplary ignition patterns respectively;

FIG. 17 shows an exemplary table of an ignition pattern which is applied to the embodiment of FIG. 16;

FIG. 18 is a graph showing exemplary relationships between engine rotational speed and vehicle speed;

FIG. 19 is a graph showing the operation of the embodiment of FIG. 16;

FIGS. 21 and 23 are graphs showing the operation of prior art ignition controllers respectively; and FIG. 22 is a table showing an exemplary ignition pattern which is applied to the prior art.

DESCRIPTION OF THE PREFERRED EMBODIMENTS

Figure 1:
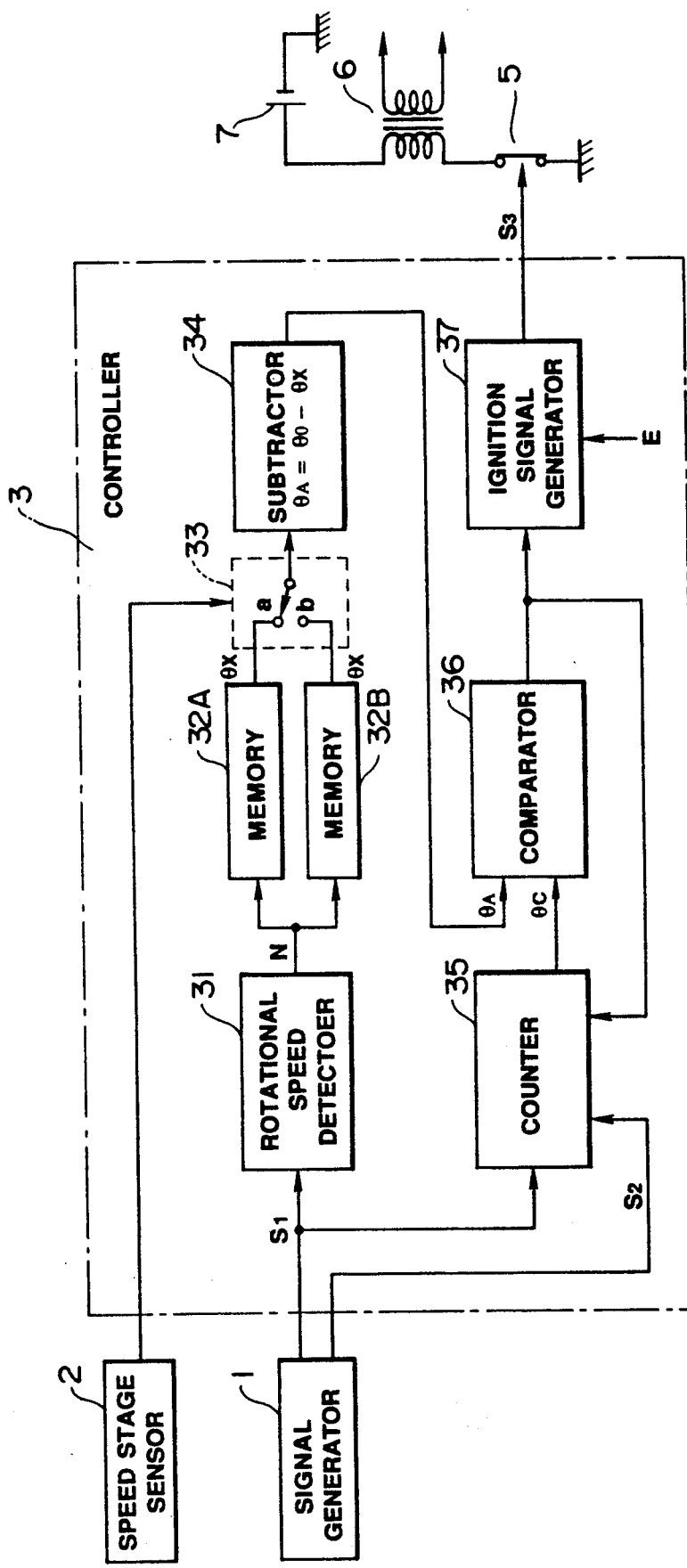
FIG. 1 is a block diagram showing an embodiment of an ignition controller in accordance with the present invention.

Referring to FIG. 1, there is shown an embodiment of an ignition controller in accordance with the present invention which is applied to a 4-cylinder engine of an automatic two-wheel vehicle.

Figure 3:
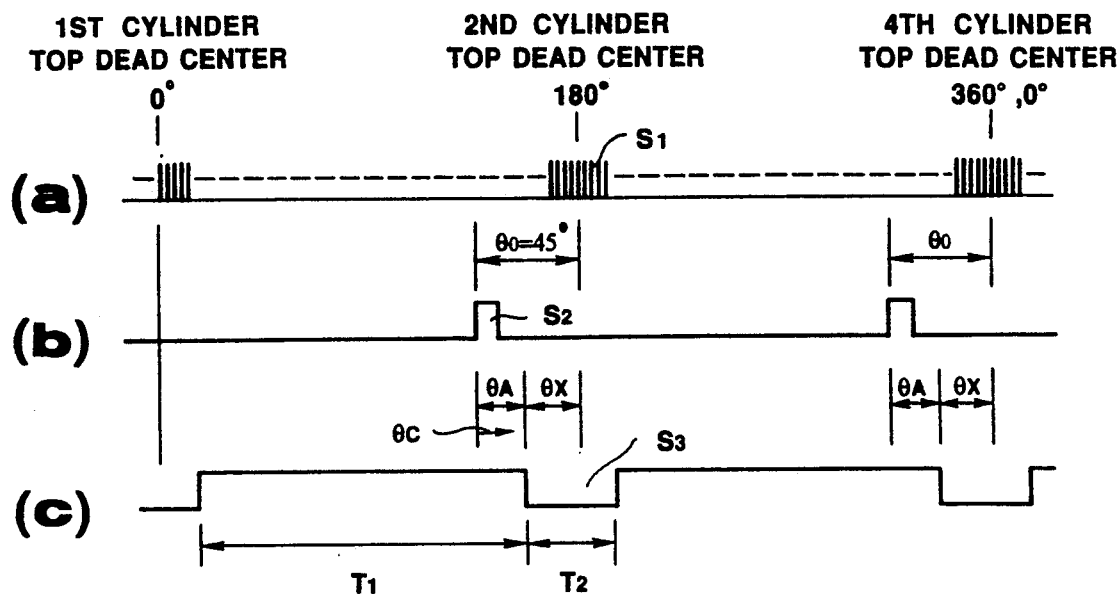
FIGS. 3(a)-(c) are timing charts showing exemplary contents of angle advance control.

In the drawing, a signal generator 1 outputs such a pulse signal $S_1$ as shown in FIG. 3(a) each time a crankshaft (not shown) of an engine rotates a very small preset angle (for example, 1° to 5°) and also outputs such a reference timing signal $S_2$ as shown in FIG. 3(b) each time the crank angle reaches a reference angle advanced by $\theta_o$ (e.g., 45°) with respect to a top dead center angle.

The signal generator 1 comprises a disk rotated by, for example, the crankshaft, an electromagnetic pickup for converting into an electric signal a magnetic change caused by a slit or the like provided in the peripheral edge portion of the disk.

A speed-stage sensor provided for detecting the first speed stage at which a transmission (not shown) is set, comprises a limit switch or the like which is activated, for example, when a shift lever (not shown) is moved to the first speed stage position.

The output signals $S_1$ and $S_2$ of the signal generator 1 as well as an output signal of the speed stage sensor 2 are all applied to a controller 3.

Figure 4:
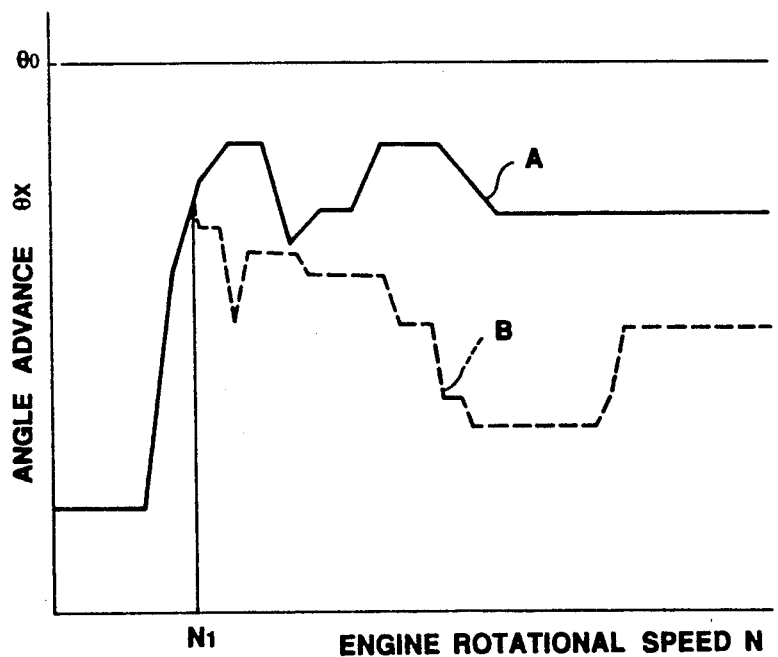
FIG. 4 is a graph showing an example of angle advance characteristics.

The controller 3 includes a memory 4 in which such two sorts of spark advance characteristics, i.e., two or more speed stages as exemplified in FIG. 4 are set.

The controller also includes a rotational-speed detector 31 which receives the pulse signal $S_1$ from the signal generator 1, detects a rotational speed N of the engine on the basis of the number of such signals $S_1$ generated per unit time, and outputs a signal indicative of the detected rotational speed to memories 32A and 32B.

Previously stored in the memories 32A and 32B are such spark advance characteristics A and B as shown in FIG. 4. The memories 32A and 32B read out spark advance angles $\theta_x$ on the characteristics A and 8 corresponding to the received engine rotational speed and apply signals indicative of the advance angles to contacts a and b of a change-over switch 33.

The change-over switch 33, which is normally connected to the contact a side, is shifted as connected, when the speed stage sensor detects the first speed stage, to the contact b side.

In other words, the output signal of the memory 32A is applied to a subtracter 34 when the speed stage is not set at the first stage; while the output signal of the memory 32B is applied to the subtracter 34 when the speed stage is set to the first stage.

The subtracter 34 computes $\theta_A = \theta_0 - \theta_x$ on the basis of the spark advance angle $\theta_x$ received from the memory 32A or 32B and the reference angle $\theta_0$ in the reference timing signal S, shown in FIG. 3(b), and supplies an output signal corresponding to the angle $\theta_A$ obtained through the computation to one input of a comparator 36.

As shown in FIG. 4, the reference angle $\theta_0$ is set to be a value larger than the maximum of the spark advance angle $\theta_x$ on the characteristics A and B and thus the angle $\theta_A$ always assumes a positive value.

The signal generator 1 is also connected to a counter 35. The counter 35, when receiving such a reference angle signal $S_2$ as shown in FIG. 3(b), starts the counting of the pulse signal $S_1$ shown in FIG. 3(a), and applies its output signal indicative of the counted value to the other input of the comparator 36.

The count value of the counter 35 indicates the rotary angle $\theta_c$ of the crankshaft after generation of the signal $S_2$.

The comparator 36, when receiving the angles $\theta_c$ and $\theta_A$, compares these angles and outputs its output signal when $\theta_c = \theta_A$, that is, when the crankshaft rotates from the top dead center angle of the crankshaft to an angle advanced by the advance angle $\theta_x$.

The output signal of the comparo36 is fed back to the counter 35 as its reset signal and also to an ignition signal generator 37 as an ignition timing signal.

The ignition signal generator 37, when receiving the ignition timing signal from the comparator 36, outputs such a negative polarity pulse signal $S_3$ having a time width $T_2$ as shown in FIG. 3(c). The signal $S_3$ is used to open a switching element 5 comprising a transistor or the like to thereby break the primary current of an ignition coil 6.

Breaking of the primary current causes a high voltage to be induced in the secondary winding of the ignition coil 6 so that the induced voltage is applied to an ignition plug corresponding to predetermined one of the cylinders of the engine. As a result, it will be appreciated that the ignition plug is sparked when the crank angle is advanced by the angle $\theta_x$ with respect to the top dead center angle.

As already explained above, the spark advance angle $\theta_x$ is set in accordance with the characteristic A in FIG. 4 when the speed stage is not set at the first stage and in accordance with the characteristic B in FIG. 4 when the speed stage is set at the first stage, respectively.

Figure 5:
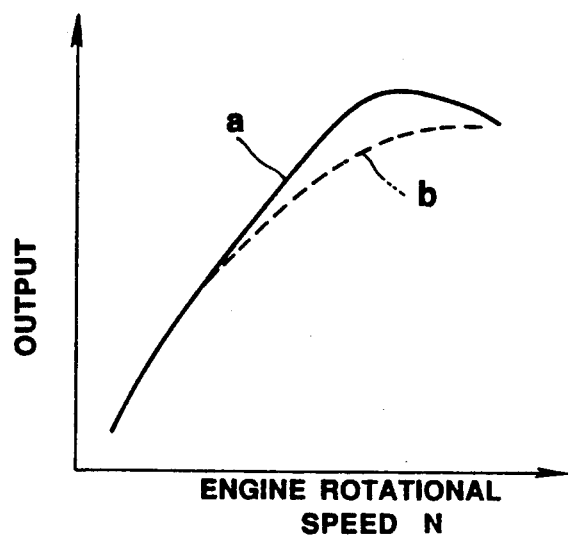
FIGS. 5 and 6 are graphs exemplifying output characteristics of engines respectively.

The spark advance characteristic A is set so that the engine is ignited at proper timing. That is, when ignition is carried out at such timing that follows the characteristic A, such a high engine output as exemplified by a curve a in FIG. 5 can be obtained.

Meanwhile, as shown in FIG. 4, the spark advance characteristic 8 is set, in a rotational speed zone where the engine rotational speed N is larger than $N_1$ (for example, 2300 rpm), to be smaller in the advance angle $\theta_x$ than the characteristic A. Accordingly, when the engine is ignited at timing following the characteristic B, the engine rotational speed is lowered in a rotational speed zone exceeding $N_1$ as shown by a curve b in FIG. 5.

In the present embodiment, when the transmission speed stage is set at the first stage, the spark advance angle $\theta_x$ is set to follow the characteristic B. As a result, it can be favorably prevented that the engine output is increased to an excessive level during running of the vehicle set at the first speed stage, whereby driving feeling can be improved and accelerator manipulation can be facilitated during the first stage run.

Figure 2:
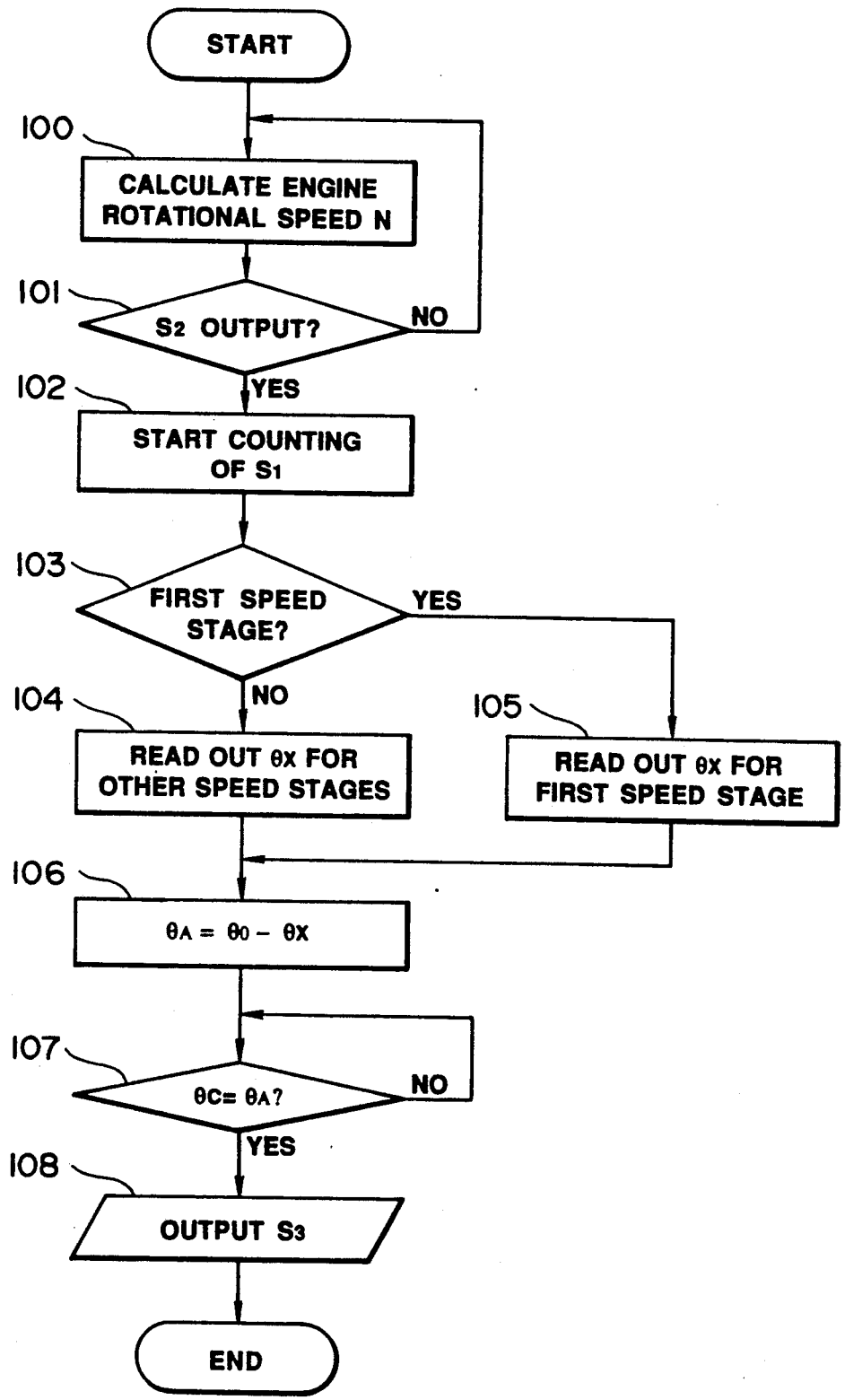
FIG. 2 is a flowchart for explaining the operation of the controller of FIG. 1.

Shown in FIG. 2 is a flowchart for explaining the operation of the controller 3 shown in FIG. 1.

In the drawing, step 100 is for the operation of the rotational-speed detector 31, steps 101 and 102 for the operation of the counter 35, step 103 for the operation of the speed stage sensor, steps 104 and 105 for the operation of the switch 33, step 106 for the operation of the subtracter 34, step 107 for the operation of the comparator 36, and step 108 for the operation of the ignition signal generator 37, respectively.

It is desirable that a current-supply period $T_1$ in FIG. 3(c) be set to be longer as a voltage E of a battery 7 is lower, because the lower the battery voltage E is, the less the electric energy per unit time accumulated in the primary winding of the ignition coil 6 is.

To this end, in the present invention, the ignition signal generator 37 incorporates a means for making the current-supply period $T_1$ larger as the battery voltage E decreases, that is, in other words, for shortening the time width $T_2$ of the signal $S_3$.

Figure 6:
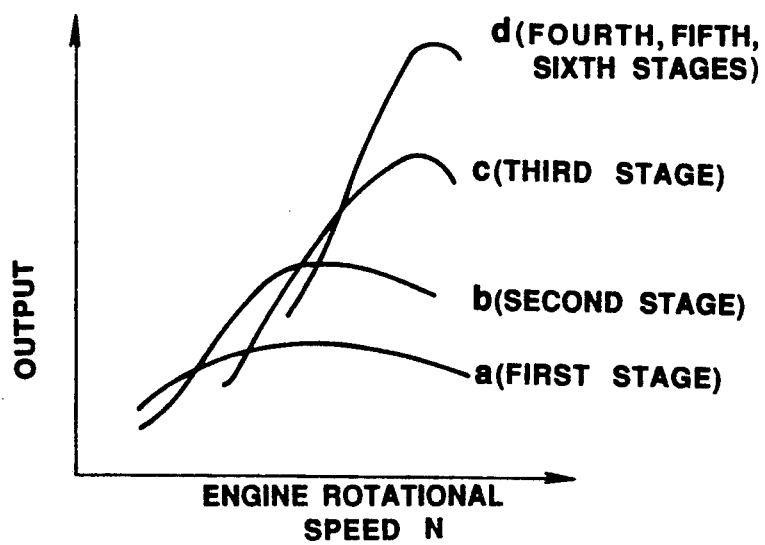

Although the engine output in the first stage operation has been suppressed with use of the advance characteristics intended only for the first speed stage in the foregoing embodiment, advance characteristics, for example, for the first stage, for the second stage, for the third stage and for the fourth, fifth and sixth stages may be respectively separately set and be selectively used according to the application speed stage to obtain such output characterisitcs a, b, c and d as exemplified in FIG. 6.

In this case, it is of course necessary to provide means for separately detecting set one of the above respective speed stages.

Though ignition timing has been set with use of purely electronical means in the foregoing embodiment, the ignition timing may also be set with use of other suitable means as necessary.

For example, when a conventional governor type advance angle mechanism is attached with an actuator (e.g., pulse motor) for advance angle change and the actuator is actuated in accordance with the characteristics A and B shown in FIG. 4, it is also possible to set desired ignition timing.

Figure 7:
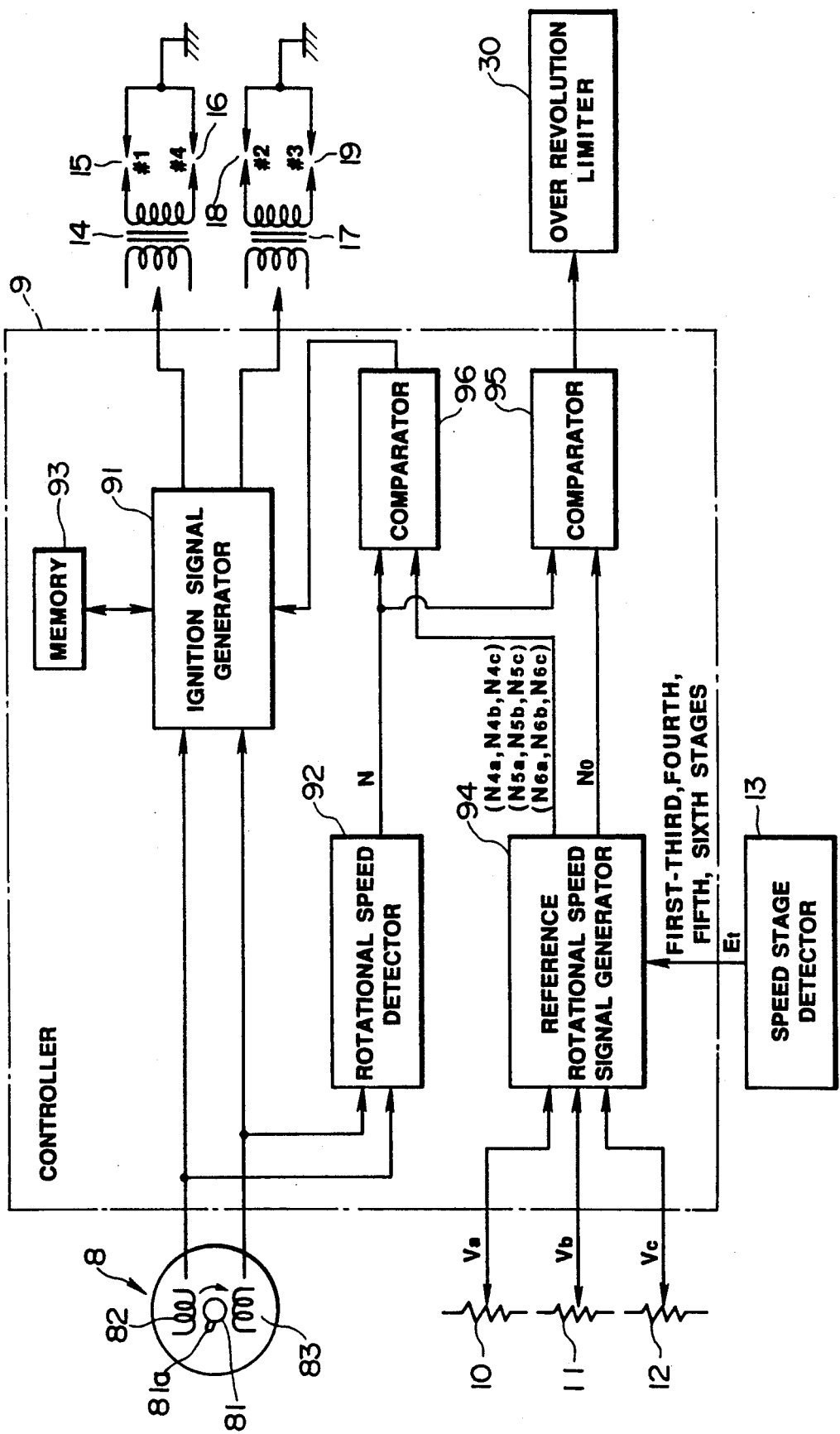
FIG. 7 is a block diagram showing another embodiment of the ignition controller in accordance with the present invention.

FIG. 7 shows another embodiment of the ignition controller in accordance with the present invention, in which an engine is ignited in accordance with an ignition pattern having a predetermined misfire rate to thereby limit the vehicle speed.

The present invention is applied to a 4-cylinder engine for mounting on an automatic motor bicycle, but may be applied to an engine for mounting on a passenger car, as a matter of course.

In FIG. 7, a signal generator 8 includes a rotor 81 rotated by the crankshaft of an engine (not shown) and pickup coils 82 and 83 disposed as opposed to each other with intervention of the rotor 81 therebetween.

The rotor 81 has a magnet 81a. Thus, when the rotor 81 is rotated, this causes electric signals mutually shifted in phase by 180° to be induced in the pickup coils 82 and 83, so that these output signals are applied to the controller 9, in particular, to an ignition signal generator 91 and a rotational speed detector 91 provided therein.

The rotational speed detector 92 detects the actual rotational speed N of the engine on the basis of the number of such output signals per unit time received from the coils 82 and 83 and outputs a signal indicative of the detected rotational speed N.

The controller also includes a memory 93 in which such ignition patterns A, B and C as shown respectively in FIGS. 9, 10 and 11, where mark ◯ denotes ignition and mark × denotes misfire, are previously stored.

The ignition pattern A of FIG. 9 has a misfire rate of $\frac{1}{8}$, meaning that only one mifiring for the #1 cylinder occurs in 8 successive ignitions.

As shown in FIG. 9, the engine, to which the present invention is applied, is ignited in the order of #1 cylinder→#2 cylinder→#4 cylinder→#3 cylinder.

The ignition pattern B of FIG. 10 has a misfire rate of 2/8, meaning that respectively only one misfiring for the #1 and #2 cylinders occurs in 8 successive ignitions.

The ignition pattern C of FIG. 11 has a misfire rate of $\frac{3}{8}$, meaning that respectively only one misfiring for the #1, #2 and #4 cylinders occurs in 8 successive ignitions. In the case of the misfire rate of $\frac{3}{8}$, the vehicle speed is lowered when the vehicle is running on a flat road under substantially no wind condition.

Figure 12:
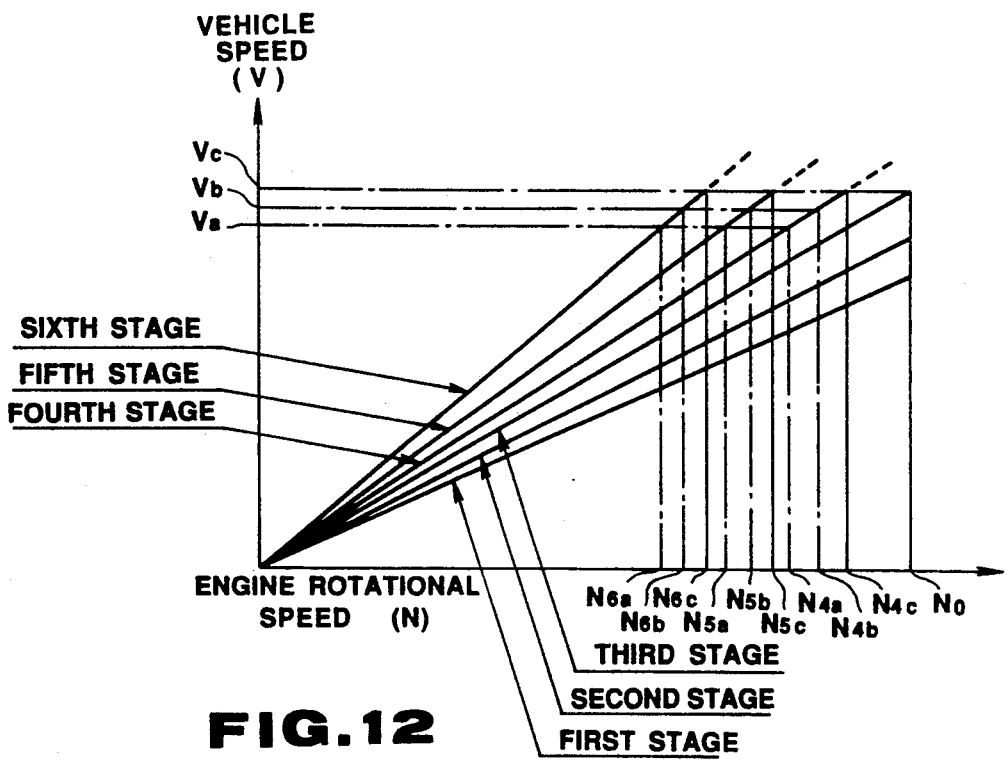
FIG. 12 is a graph showing relationships between engine rotational speed and vehicle speed.

FIG. 12 shows, as an example, relationships between the engine rotational speed N and the vehicle speed V with respect to different transmission speed stages. These relationships are previously stored in a memory incorporated in a reference rotational-speed generator 94.

As will be clear from FIG. 12 that the vehicle speed V can be detected on the basis of the engine rotational speed N and one of the speed stages being used. And in the case where a reference vehicle speed $V_a$ corresponding to an allowable maximum vehicle speed, a reference vehicle speed $V_b$ slightly smaller than the speed $V_a$ and a reference vehicle speed $V_c$ slightly smaller than the speed $V_b$ are set as given in the drawing, engine rotational speeds corresponding to these speeds $V_a$, $V_b$ and $V_c$ can be known on the basis of the relationship curves of FIG. 12.

More in detail, when the speed stage is set at the sixth stage for example, it will be seen from associated one of the curves of FIG. 12 that the reference vehicle speeds $V_a$, $V_b$ and $V_c$ correspond to engine rotational speeds $N_{6a}$, $N_{6b}$ and $N_{6c}$ respectively.

As shown in the drawing, in the case of the first to third speed stages, the engine rotational speed N arrives at the rotational speed limit $N_o$ before the vehicle speed reaches $V_a$, $V_b$ and $V_c$.

Vehicle speed setters 10, 11 and 12 shown in FIG. 7 are provided for setting the above vehicle speeds $V_a$, $V_b$ and $V_c$ as their reference speeds respectively; while a speed stage detector 13 is provided for detecting selected one of the transmission speed stages.

Figure 13:
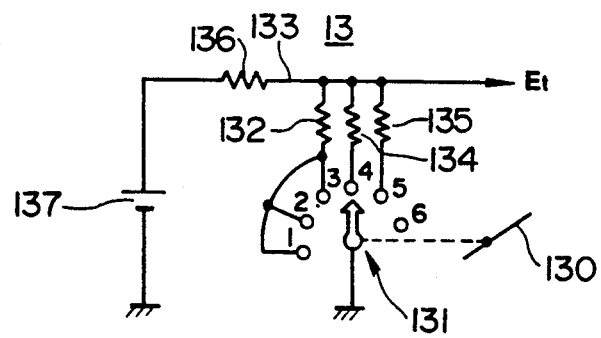
FIG. 13 is a circuit diagram showing an exemplary arrangement of a speed stage detector.

The speed stage detector 13 includes a rotary switch 131 interlinked with a gear shift lever 130 as shown in FIG. 13. When the switch 131 is set at positions corresponding to the first to third speed stages, a line 133 is grounded through a resistor 132; while, when the switch 131 is at positions corresponding to the fourth and fifth speed stages, the line 133 is grounded through resistors 134 and 135. When the switch 131 is at a sixth stage position, the line 133 is put in its open condition.

The resistors 132, 134 and 135 have respectively different values and the line 133 is connected through a common resistor 136 to a battery 137. Accordingly, a division voltage E, on the line 133 varies depending on one of the speed stages being used, that is, has different values respectively for the first to third speed stages, for the fourth speed stage, for the fifth speed stage and for the sixth speed stage. The output voltage $E_t$ of the speed stage detector 13 is applied to the reference rotational-speed signal generator 94.

The reference rotational-speed signal generator 94 is operated as follows on the basis of the output signals of the vehicle speed setters 10, 11 and 12 and the output signal of the speed stage detector 13 and according to the relationships shown in FIG. 12.

More specifically, when one of the speed stages being used is any one of the first to third speed stages, the reference rotational-speed signal generator 94 generates such a signal corresponding to the allowable maximum rotational speed $N_o$ as shown in FIG. 12 and sends it to a comparator 95.

In the case where the speed stages being used are the fourth, fifth and sixth ones respectively, the reference rotational-speed signal generator 94 generates signals corresponding respectively to the reference engine rotational speeds ($N_{4a}$, $N_{4b}$, $N_{4c}$), ($N_{5a}$, $N_{5b}$, $N_{5c}$) and ($N_{6a}$, $N_{6b}$, $N_{6c}$) and applies them to a comparator 96.

A spark plug 15 for the #1 cylinder and a spark plug 16 for the #4 cylinder are connected in series with each other between both ends of a secondary winding of an ignition coil 14, while a spark plug 18 or the #2 cylinder and a spark plug 19 for the #3 cylinder are connected in series with each other between both ends of a secondary winding of another ignition coil 17.

Accordingly, the plugs 15 and 16 are simultaneously sparked but the explosion strokes of the #1 and #4 cylinders in the 4-cylinder engine are mutually shifted by 360° in phase, so that either one of the plugs does not contributes to ignition. This explanation similarly holds true even for a relationship between the plugs 18 and 19.

The operation of the present embodiment will then be explained.

Assume now that the speed stage detector 13 detects the sixth speed stage. Then the reference rotational-speed signal generator 94 outputs the signal indicative of the reference rotational speeds $N_{6a}$, $N_{6b}$ and $N_{6c}$ (refer to FIG. 12).

The comparator 96 compaes the rotational speeds $N_{6a}$, $N_{6b}$ and $N_{6c}$ received from the generator 94 with the actually detected engine rotational speed N received from the rotational speed detector 92. And while $N \leq N_{6a}$, the comparator 96 outputs no signal, in which case an ignition signal generator 91 generates an ignition signal for ordinary ignition without involving any misfiring.

That is, the ignition signal generator 91 generates such an ignition signal that causes sequential ignition of the #1, #2, #4 and #3 cylinders of the engine on the basis of ignition timing signals received from the coils 82 and 83 of the signal generator 8, and supplies the ignition signal to the respective primary windings of the ignition coils 14 and 17. As a result, when the acceletor opeing is set to be large as in its acceleration mode, the engine rotational speed increases with time as shown in FIG. 14.

When the engine rotational speed is increased to a condition $N_{6b} > N > N_{6a}$, the comparator 96 outputs a command signal for performing ignition based on the pattern A (refer to FIG. 9).

In this case, the ignition signal generator 91, when receiving the command signal from the comparator 96, generates such an ignition signal that misfiring for the #1 cylinder occurs at a rate of once per two times and applies it to the ignition coils 14 and 17.

Figure 14:
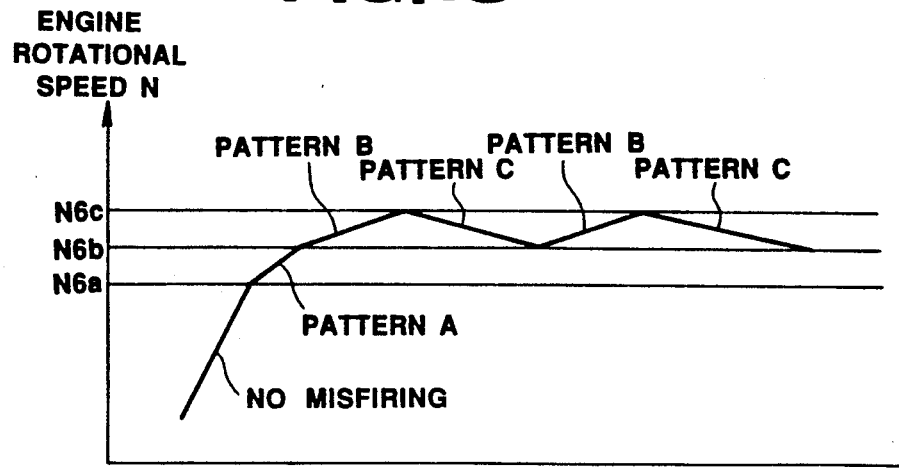
FIG. 14 is a graph showing an exemplary change in engine rotational speed when ignition control is carried out.

This results in that the #1 cylinder is actuated with a misfire rate of ½ and the engine output is reduced to thereby lower the increase rate of the engine rotational speed as shown in FIG. 14.

When the engine rotational speed N is further increased and reaches a condition $N_{6c} > N > N_{6b}$, the comparator 96 outputs such a command signal that causes ignition based on the pattern B (refer to FIG. 10).

Thus, the ignition signal generator 91, when receiving the command signal from the comparator 96, supplies to the ignition coils 14 and 17 such an ignition signal causes misfiring of the #1 and #2 cylinders of the engine respectively at a rate of once per two times. This results in that the increase rate of the engine rotational speed is further decreased as shown in FIG. 14.

Thereafter, when the engine rotational speed N is increased to reach a condition $N \geq N_{6c}$, the comparator 96 outputs a command signal for performing ignition based on the pattern C (refer to FIG. 11).

This causes the ignition signal generator 91 to supply to the ignition coils 14 and 17 such an ignition signal that causes misfiring of the #1, #2 and #4 cylinders of the engine respectively at a rate of once per two times.

In this case, the engine output is remarkably reduced and the engine rotational speed N is decreased toward the rotational speed $N_{6b}$. When the rotational speed N reaches $N_{6b}$, ignition control based again on the pattern B is carried out to slowly increase the rotational speed N.

After this, while the engine rotational speed is in such a condition that the speed can increase, ignition controls based on the patterns B and C are alternately repeated. This causes the engine rotational speed to be slowly increased and decreased with a relatively long period in a rotational speed range of from $N_{6b}$ to $N_{6c}$, with the result that the engine rotational speed is gradually set nearly at the rotational speed limit $N_{6c}$.

In this way, in the present embodiment, ignition control to reduce the increase rate of the engine rotational speed is effected before the engine rotational speed N reaches the rotational speed limit $N_{6c}$. Thus, it can be prevented that the engine rotational speed is sharply hunting around the rotational speed limit $N_{6c}$, resulting in that the driving feeling can be improved.

Figure 8:
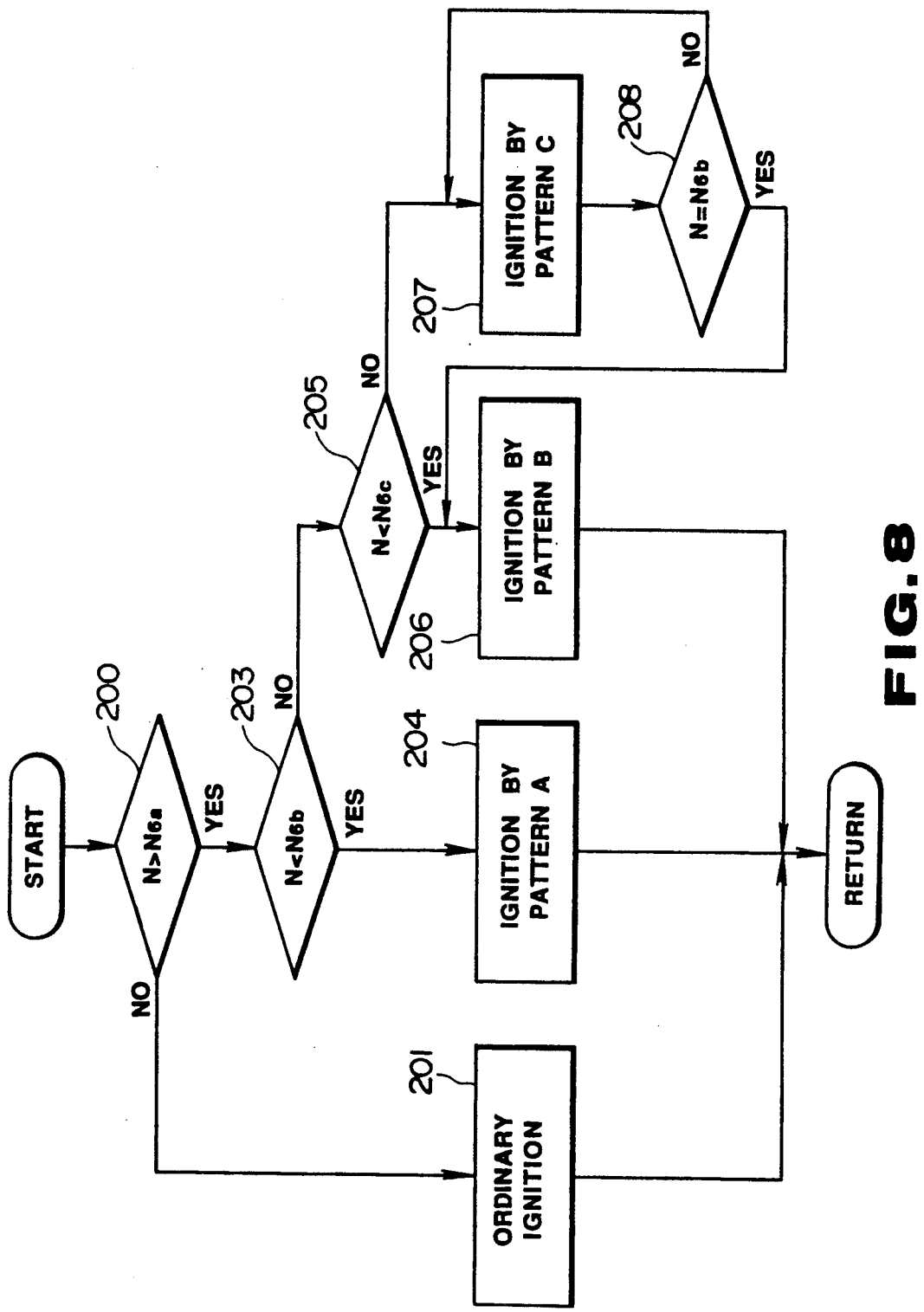
FIG. 8 is a flowchart explaining the operation of the controller of FIG. 7.

Shown in FIG. 8 is a flowchart for explaining the operation of the aforementioned controller 9 in the case where the speed stage is set at the sixth one. In the drawing, steps 200, 203, 205 and 208 denote the operation of the comparator 96; and steps 201, 204, 206 and 207 denote the operation of the ignition signal generator 91.

Though explanation has been made as to the ignition control when the speed stage is set at the sixth one, the similar ignition control can be carried out even in the case where the speed stage is set at the fifth and fourth stages.

Explanation will next be made as to the case where the speed stage is set at the first to third ones.

When the speed stage is set at the first to third ones, there is a danger that the engine is driven at a rotational speed above the allowable maximum engine rotational speed $N_o$ as shown in FIG. 12. However, such a disadvantage can be avoided in the present embodiment.

More in detail, as has been explained above, when the speed stage is set at the first to third ones, the reference rotational speed signal generator 94 outputs a signal indicative of the allowable maximum engine rotational speed $N_o$ and sends it to the compartor 95.

At this time, the ignition signal generator 94 is not received a command signal from the comparator 96 and thus outputs an ignition signal for performing the oridnary ignition without causing any misfiring.

The comparator 95, on the other hand, compares the engine rotational speed N with the allowable maximum rotational speed $N_o$ and when $N \geq N_o$, it outputs a signal indicative of an over-revolution. The over-revolution signal is sent to an over-revolution limiter 30 to reduce the engine rotational speed down to below $N_o$.

As a result, in the present embodiment, the overrevolution of the engine can be prevented in the case of the speed stage set at one of the first to third stages.

The two set rotational speeds $N_{6b}$ ($N_{5b}$, $N_{4b}$) and $N_{6a}$ ($N_{5a}$, $N_{4a}$) other than the rotational speed limit $N_{6c}$ ($N_{5c}$, $N_{4c}$) have been provided in the foregoing embodiment, but practically sufficient running feeling can be obtained even by executing only the ignition control based on the ignition patterns B and C with use of one $N_{6b}$ ($N_{5b}$, $N_{4b}$) of the two set rotational speeds.

In addition, it is also possible to perform finer ignition control by preparing two or more set rotational speeds.

Though the #1 cylinder has been set to be misfired in the ignition pattern A of FIG. 9, any one of the other cylinders than the #1 cylinder may be set to be misfired in place of the #1 cylinder. Similarly, the #1 and #2 cylinders have been set to be ignited in the ignition pattern B of FIG. 10, but the #3 and #4 cylinders may be set to be ignited with the similar effects.

In summary, cylinders to be misfired are not limited so long as they provides a predetermined misfire rate. This also holds true even for the ignition pattern C. And the misfire rates of the ignition patterns A, B and C are also not restricted to the above specific examples and may be suitably set depending on the type of the vehicle to be used.

Figure 15:
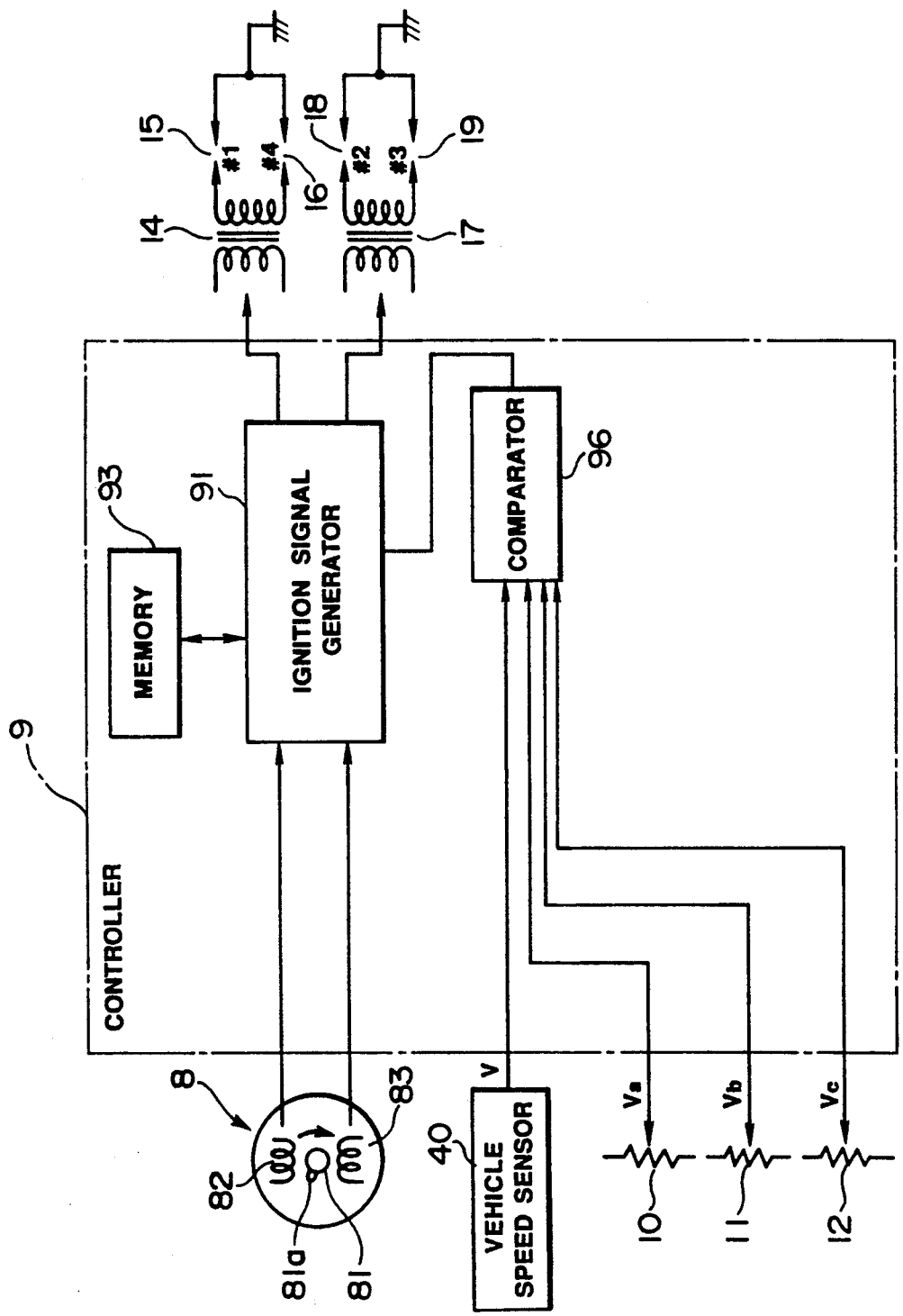
FIG. 15 is a bock diagram showing a further embodiment of the ignition controller in accordance with the present invention.

In the foregoing embodiment, the vehicle speed has been converted into an engine rotational speed with use of the relationships of FIG. 12 and ignition control has been effected based on the converted engine rotational speed. However, such an embodiment as shown in FIG. 15 may also be possible that a vehicle speed sensor 40 directly detects a vehicle speed and a comparator 96 compares the detected vehicle speed with reference vehicle speeds $V_1$, $V_2$ and $V_3$ set by vehicle speed setters 10, 11 and 12. In this case, it becomes unnecessary to detect the engine rotational speed and the speed stage, as a matter of course.

Then yet a further embodiment of the ignition controller in accordance with the present invention will be explained by referring to FIG. 16.

In the drawing, the same elements as those in FIG. 7 are denoted by the same reference numerals and explanation thereof is omitted.

Figure 16:
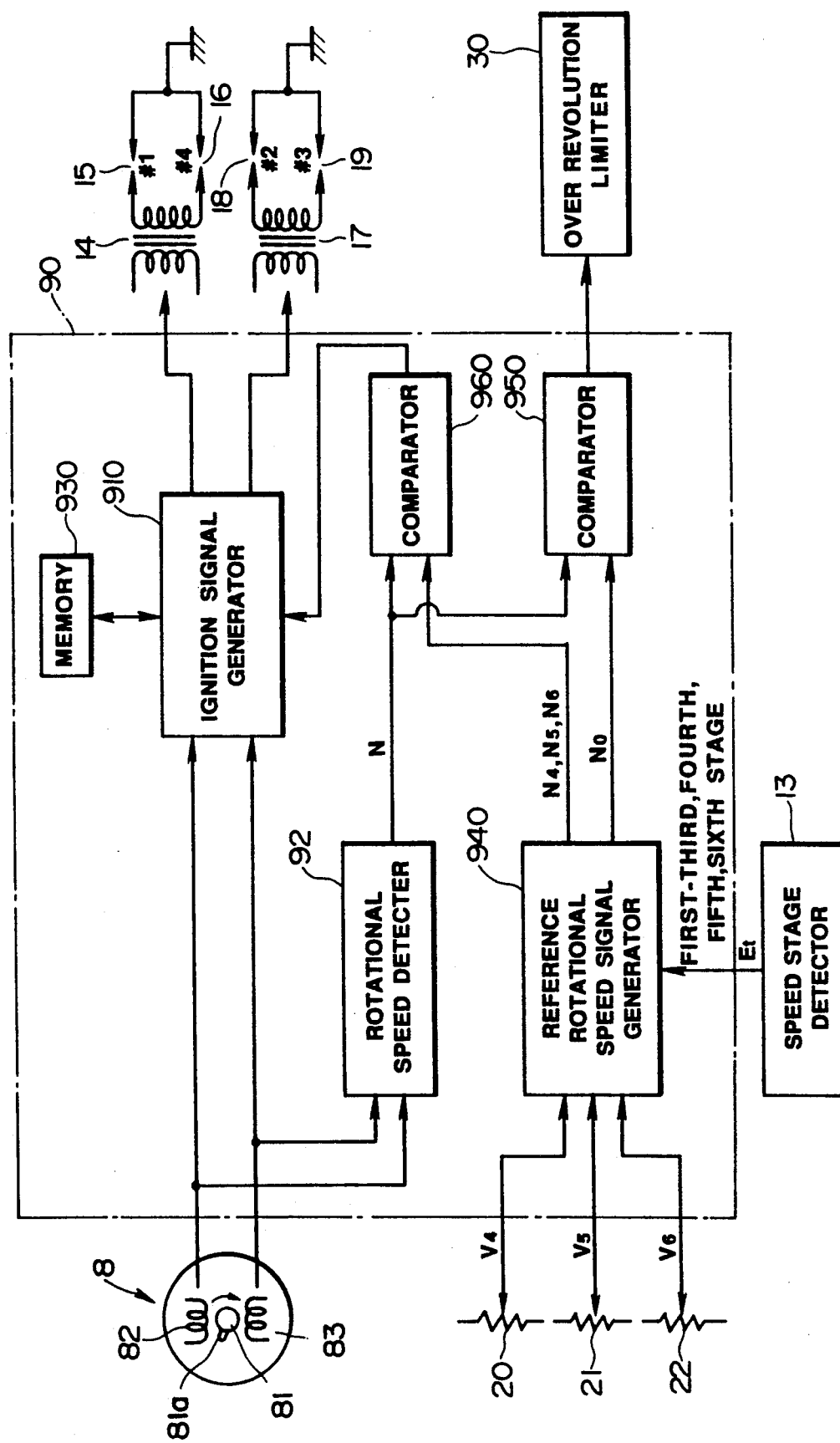
FIG. 16 is a block diagram showing yet a further embodiment of the ignition controller in accordance with the present invention.

Previously stored in a memory 930 of the controller 90 shown in FIG. 16 is such an ignition pattern having a misfire rate of 3/8 as shown in FIG. 17, that is, such a misfire pattern that causes misfiring (indicated by mark $\times$ in FIG. 17) of the #1, #2 and #4 cylinders respectively once per successive 8 time ignition timings. This ignition pattern has the same contents as that of FIG. 11. In the case where this pattern is employed, the engine rotational speed is decreased even when the accelerator opening is maximum.

As shown in FIG. 17, in the case of an engine to which the present embodiment is applied, ignition is effected in this order of #1 cylinder→#2 cylinder→#4 cylinder→#3 cylinder.

FIG. 18 shows exemplary relationships between the engine rotational speed N and vehicle speed V with respect to different speed stages of a transmission (not shown) and these relationships are previously stored a memory incorporated in a reference rotational speed generator 940.

It will be clear from FIG. 18 that the vehicle speed V can be detected on the basis of the engine rotational speed N and one of the speed stages being used. When reference vehicle speeds $V_4$, $V_5$ and $V_6$ ($V_4 < V_5 < V_6$) are set for the fourth, fifth and sixth speed stages respectively as shown in FIG. 18, reference engine rotational speeds $N_4$, $N_5$ and $N_6$ corresponding to the vehicle speeds $V_4$, $V_5$ and $V_6$ respectively can be determined based on the relationships of FIG. 18. Of the vehicle speeds $V_4$ to $V_6$, the speed $V_6$ means the allowable maximum vehicle speed.

It will be seen from FIG. 18 that, when the speed stage set at the first to third ones, the engine rotational speed N reaches the allowable maximum engine rotational speed $N_o$ before the vehicle speed arrives at the reference vehicle speeds $V_4$, $V_5$ and $V_6$.

The reference rotational speed signal generator 940 receives signals indicative of the above reference vehicle $V_4$, $V_5$ and $V_6$ from vehicle speed setters 20, 21 and 22 as well as a signal indicative of one of the speed stages being used from a speed stage detector 13.

The reference rotational speed signal generator 940 operates as follows, on the basis of these input signals and the relationships of FIG. 18.

More in detail, when the speed stage is set at one of the first to third stages, the reference rotational speed signal generator 940 geneates a signal indicative of the allowable maximum engine rotational speed $N_o$ shown in FIG. 18 and applies it to a comparator 950.

When the fourth, fifth or sixth speed stage is being used, the reference rotational speed signal generator 940 generates the reference engine rotational speed $N_4$, $N_5$ or $N_6$ shown in FIG. 18 and applies them to a comparator 960.

In the operation of the present embodiment, when any one of the first to third speed stages is set, the reference rotational speed signal generator 940 outputs a signal indicative of the allowable maximum engine rotational speed $N_o$.

At this time, the ignition signal generator 910 generates an ignition signal for perfoming ordinary ignition without causing any misfiring.

More specifically, ignition signal generator 910 generates, on the basis of ignition timing signals received from coils 82 and 83 in a signal generator 8, ignition signals for causing sequential ignition of the #1, #2, #4 and #3 cylinders of the engine and sends these ignition signals to ignition coils 14 and 17.

During running of the vehicle set at one of the first to third speed stages, the comparator 950 compares the signal indicative of the allowable maximum engine rotational speed $N_o$ with the signal indicative of the engine rotational speed N.

The comparator 950, when $N \geq N_o$, outputs a signal indicative of a overrevolution to the overrevolution limiter 30. The overrevolution limiter 30 functions to reduce the then engine rotational speed by means of fuel cut or the like.

Next, when the speed stage is shifted up from the first stage to the fourth one, the reference rotational speed signal generator 940 outputs a signal indicative of the engine rotational speed $N_4$ corresponding to the reference vehicle speed $V_4$ and the output signal is sent to the comparator 960 to be comapred therein with a signal indicative of the actual engine rotational speed N.

The comparator 960, when $N \leq N_4$, outputs a signal indicative of an ordinary ignition command to the ignition signal generator 910, with the result that the ignition signal generator 910 sends ignition signals causing no misfiring to the ignition coils 14 and 17.

Duing the fourth speed stage running of the vehicle, if the engine rotational speed N is increased to exceed the rotational speed limit $N_4$ that is a limit for the fourth speed stage, that is, if the vehicle speed V is increased to exceed the vehicle speed limit $V_4$ shown in FIG. 18, then the comparator 960 applies to the ignition signal generator 910 a command signal for causing ignition based on the ignition pattern of FIG. 17. This causes the ignition signal geneator 910 to geneate and output such ignition signals that cause misfiring of the #1, #2 and #3 cylinders respectively once per successive 8 time ignition timings, on the basis of the aforementioned ignition pattern previously stored in the memory 930 received therefrom and the ignition timing signals received from the generator 8.

This results in that the engine is driven at a misfire rate of 3/8 so that the engine output decreases and the engine rotational speed correspondinly drops. Since the ignition based on the above pattern causing such misfiring is carried out each time the engine rotational speed N satisfies $N > N_4$, the vehicle speed V is gradually set at nearly $V_4$ as shown in FIG. 19.

Consider now that the speed stage is shifted from fourth stage to the fifth. Then the reference rotational speed signal generator 940 outputs a signal indicative of the engine rotational speed $N_5$ corresponding to the reference vehicle speed $V_5$ and thus the comparator 960 compares the rotational speed $N_5$ with the actual engine rotational speed N. Under such a condition that $N \leq N_5$, the comparator 960 outputs no signal, in which case the ignition signal generator 910 generates and outputs ignition signals for causing ordinary ignition without any misfiring.

Therefore, the vehicle speed V is increased as shown by reference symbol a in FIG. 19.

And when the vehicle speed V exceeds the vehicle speed limit $V_5$, that is, when the engine rotational speed N satisfies $N > N_5$, the comparator 960 outputs a command signal for effecting the ignition based on the ignition pattern of FIG. 17. This causes the ignition signal generator 91 to generate ignition signals based on the same pattern and to supply them to the ignitio coils 14 and 17.

As a result, the engine rotational speed N is decreased so that, when the speed N meets $N \leq N_5$, the ordinary ignition is again carried out and the speed N is increased. Thereafter, the similar ignition control is repeated so that the vehicle speed V is gradually set at nearly $V_5$ as shown in FIG. 19.

When the speed stage is next shifted up from the fifth stage to the sixth, the comparator 960 compares the actual engine rotational speed N with the reference rotational speed $N_6$ of the sixth speed stage. Immediately after such stage shift up, a relationship $V < V_6$ is satisfied, that is, $N < N_6$, so that the comparator 960 outputs no command signal. Therefore, the ordinary ignition without causing any misfiring is carried out so that the vehicle speed V increases as shown by reference symbol b in FIG. 19.

And when the vehicle speed V exceeds $V_6$, that is, when the engine rotational speed N meets a relationship $N > N_6$, the comparator 960 outputs a command signal, whereby the ignition signal geneator 910 outputs such ignition signals that follow the ignition pattern of FIG. 17. Thereafter, each time a relationship $N < N_6$, the ignition based on the above ignition pattern is carried out, with the result that the vehicle speed V is gradually set nearly at the vehicle speed limit $V_6$ as shown in FIG. 19.

According to the present embodiment, the vehicle speed is increased at the time of shift-up from the fourth speed stage to the fifth and at the time of shift-up from the fifth stage to the sixth as shown by reference symbols a and b in FIG. 19, so that the driver can get acceleration meeting driver's expectation, thus contributing to improvements in driver's driving feeling.

Figure 20:
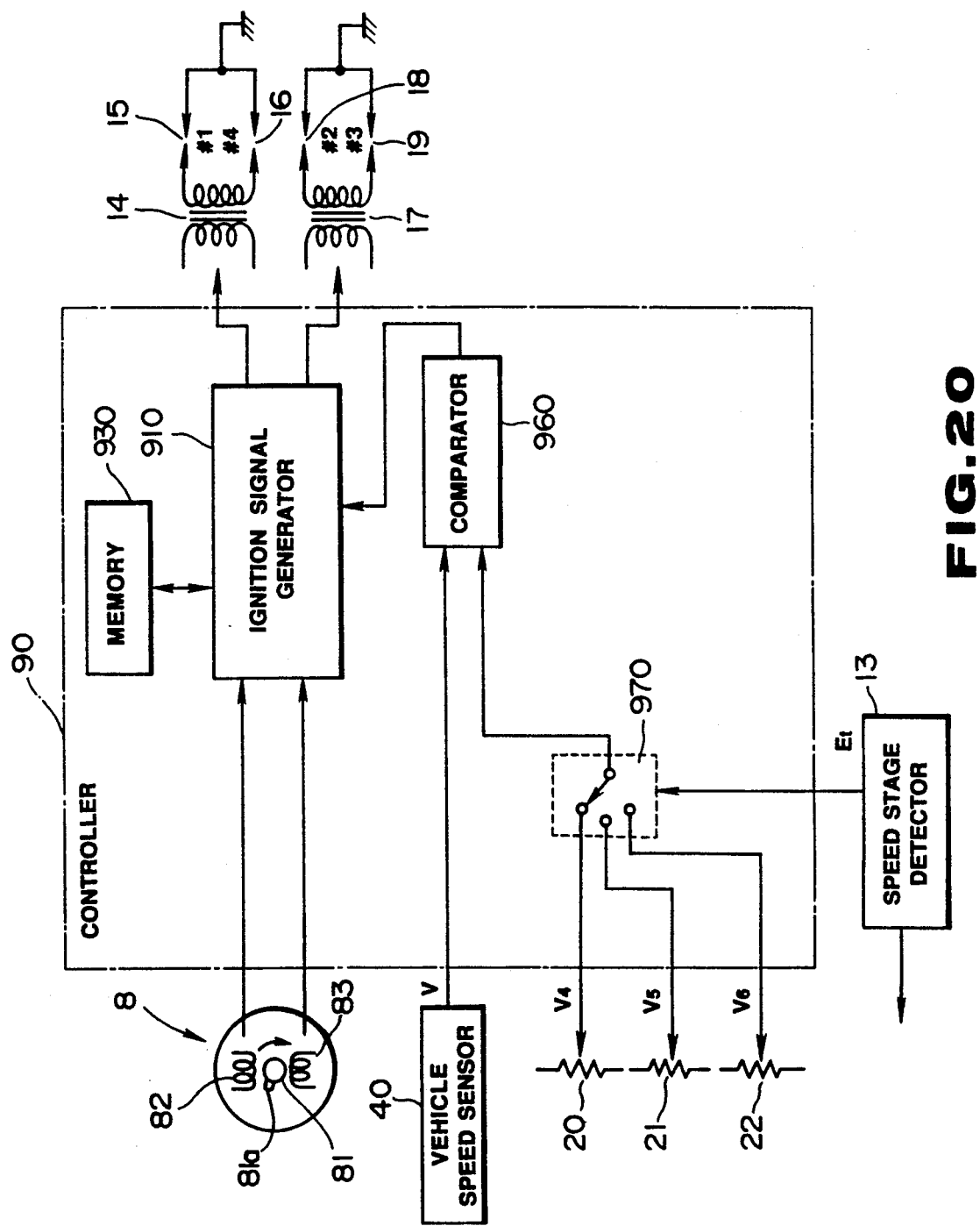
FIG. 20 is a bock diagram of yet another embodiment of the ignition controller in accordance with the present invention.

Although the reference vehicle speeds $V_4$, $V_5$ and $V_6$ have been converted into the reference engine rotational speeds $N_4$, $N_5$ and $N_6$ respectively and ignition control has been effected based on these engine rotational speeds in the foregoing embodiment, such an embodiment as shown in FIG. 20 may also be employed that a vehicle speed sensor 40 directly detects the vehicle speed V and the detected vehicle speed is compared with the aforementioned reference vehicle speeds $V_4$, $V_5$ and $V_6$ to carry out such ignition control as mentioned above. In the present embodiment, a changeover switch 970 is switchingly actuated under control of an output signal received from a speed stage detector 13 so that, when the speed stage is set at the fourth, fifth or sixth stage, the switch 970 selectively sends the reference vehicle speed $V_4$, $V_5$ or $V_6$ to a comparator 960 respectively.

It goes without saying that detection of the engine rotational speed and the speed stage is unnecessary.

In this connection, the number of preset reference vehicle speeds and the magnitudes of the respective reference vehicle speeds can be suitably set depending on the specifications of the vehicle to be applied, user's driving comfortableness and so on.

Further, the ignition pattern is also not limited to the example of FIG. 17 but such any ignition pattern having a misfire rate meeting the vehicle specifications may be selectively used. In the foregoing embodiment, mutually different ignition patterns may be set for the fourth, fifth and six speed stages respectively and may be selected depending on one of the speed stages being used.

What is claimed is:

1. An engine ignition controller including vehicle speed control means for the higher speed stages of an engine having higher transmission speed stages and lower transmission speed stages which engine ignition controller comprises: engine rotational speed detecting means (8, 92) for detecting a rotational speed of the engine;
    ignition pattern setting means (930) for setting therein an ignition pattern having a misfire rate to reduce the vehicle speed
    reference vehicle speed setting means (20, 21, 22) for setting, as vehicle speed limits, reference vehicle speeds ($V_4$, $V_5$, $V_6$) corresponding one to each of said higher speed stages;
    speed stage detecting means (13) for detecting a selected one of said speed stages being used;
    converted means (940) for converting said reference vehicle speeds into corresponding reference engine rotational speeds on the basis of said selected speed stage detected by said speed stage detecting means (13);
    comparison means (960) for comparing the rotational speed (N) detected by said engine rotational speed detecting means (8, 92) with the corresponding reference engine rotational speed for said selected and detected stage and to instruct ignition misfire based on said ignition pattern when said detected rotational speed (N) exceeds said corresponding reference engine rotation speed; and
    means (910) for generating ignition signals based on said instructed ignition pattern;
    whereby the vehicle speed at each selected stage is prevented from exceeding the corresponding reference vehicle speed ($V_4$, $V_5$, $V_6$) for that stage, and
    wherein said reference vehicle speeds ($V_4$, $V_5$, $V_6$) of the speed stages are set to be progressively larger for each higher speed stage.

2. The engine controller as set forth in claim 1, wherein the ignition pattern is independently set for each higher speed stage.

3. The engine ignition controller as set forth in claim 1, wherein the same ignition pattern is used to effect speed reduction for each said higher speed stage.

4. An engine ignition controller comprising:
    rotational speed detecting means (8, 92) for detecting a rotational speed of an engine;
    ignition pattern setting means (930) for setting therein an ignition pattern having a misfire rate to reduce a vehicle speed;
    reference vehicle speed setting means (20, 21, 22) for setting, as vehicle speed limits, reference vehicle speeds ($V_4$, $V_5$, $V_6$) corresponding to speed stages of a transmission higher in stage number than a predetermined one of said speed stages respectively;
    speed stage detecting means (13) for detecting a selected one of said speed stages being used;
    means (940) for converting said reference vehicle speeds into corresponding engine rotational speeds on the basis of said use speed stage detected by said speed stage detecting means (13);
    comparison means (960) for comparing a rotational speed (N) detected by said engine rotational speed detecting means (8, 92) with said engine rotational speeds converted by said means (940) to instruct ignition based on said ignition pattern when said detected rotational speed (N) exceeds said converted reference engine rotational speeds; and means (910) for generating ignition signals based on said instructed ignition pattern;

wherein said reference vehicle speeds ($V_4$, $V_5$, $V_6$) of the speed stages are set to be gradually larger for the higher speed stages;

wherein the engine ignition controller further comprises comparison means for comparing a predetermined allowable maximum engine rotational speed with the engine rotational speed detected by the engine rotational speed detecting means to output an overrevolution signal when the detected engine rotational speed exceeds the allowable maximum engine rotational speed and means for decreasing the engine rotational speed on the basis of the overrevolution signal.

5. An engine ignition controller comprising:

rotational speed detecting means (8, 92) for detecting a rotational speed of an engine;

ignition pattern setting means (930) for setting therein an ignition pattern having a misfire rate to reduce a vehicle speed;

reference vehicle speed setting means (20, 21, 22) for setting, as vehicle speed limits, reference vehicle speeds ($V_4$, $V_5$, $V_6$) corresponding to speed stages of a transmission higher in stage number than a predetermined one of said speed stages respectively;

speed stage detecting means (13) for detecting a selected one of said speed stages being used;

means (940) for converting said reference vehicle speeds into corresponding engine rotational speeds on the basis of said use speed stage detected by said speed stage detecting means (13);

comparison means (960) for comparing a rotational speed (N) detected by said engine rotational speed detecting means (8, 92) with said engine rotational speeds converted by said means (940) to instruct ignition based on said ignition pattern when said detected rotational speed (N) exceeds said converted reference engine rotational speeds; and means (910) for generating ignition signals based on said instructed ignition pattern;

wherein said reference vehicle speeds ($V_4$, $V_5$, $V_6$) of the speed stages are set to be gradually larger for the higher speed stages; and wherein the ignition pattern is set such that the misfire rate becomes three-eighths ($\frac{3}{8}$) in the case where the engine is a four-cylinder means.

* * * * *